United States Patent [19]

Hunter et al.

[11] Patent Number: 5,076,100
[45] Date of Patent: Dec. 31, 1991

[54] MAGNETOSTRICTIVE TRANSDUCER MEASURING SYSTEM

[75] Inventors: Lawrence M. Hunter, Canton; Ambroise Printstil, East Hartford; Richard G. Dolson, Canton Center, all of Conn.

[73] Assignee: Western Pacific Industries Inc., New York, N.Y.

[21] Appl. No.: 601,207

[22] Filed: Oct. 22, 1990

[51] Int. Cl.⁵ .................. G01F 23/00; G01R 33/18
[52] U.S. Cl. ........................ 73/290 V; 324/207.21; 367/27; 367/908; 377/24
[58] Field of Search ............ 73/290 V; 324/207.13, 324/207.17, 207.21

[56] References Cited

U.S. PATENT DOCUMENTS

| | | |
|---|---|---|
| 2,995,736 | 8/1961 | Tellerman . |
| 3,189,948 | 6/1965 | Tellerman . |
| 3,212,069 | 10/1965 | Tellerman . |
| 3,371,536 | 3/1968 | Tellerman . |
| 3,423,673 | 1/1969 | Bailey et al. ............. 324/207.13 |
| 3,699,421 | 10/1972 | Stemplar et al. . |
| 3,898,555 | 8/1975 | Tellerman ............... 324/207.13 |
| 4,298,861 | 11/1981 | Tellerman . |
| 4,305,283 | 12/1981 | Redding ............... 324/207.24 X |
| 4,349,882 | 9/1982 | Asmundsson et al. . |
| 4,654,590 | 3/1987 | Kitaura et al. ......... 324/207.17 X |
| 4,721,902 | 1/1988 | Tellerman et al. . |
| 4,915,507 | 4/1990 | Janotta ..................... 73/295 X |
| 4,939,457 | 7/1990 | Tellerman .............. 324/207.13 |
| 4,943,773 | 7/1990 | Kaski et al. ............ 324/207.24 X |

Primary Examiner—Daniel M. Yasich
Attorney, Agent, or Firm—Chilton, Alix & Van Kirk

[57] ABSTRACT

A magnetostrictive transducer measuring system for precisely measuring the liquid level of fuel in an underground tank. The system provides for the measurement of the position of one or more transducer magnets in a tube that are positioned along a length of the transducer wire therein, with one of the magnets fixed in the tube to provide a reference position. A current pulse is applied to the transducer wire and sonic pulses are simultaneously produced through the interaction of the magnetic field of the transducer wire and the fields of the magnets. The sonic pulses are detected by a sensor and the time interval between the detected sonic pulses is determined to determine the distance between the magnets.

23 Claims, 9 Drawing Sheets

MAGNETOSTRICTIVE TRANSDUCER MEASURING SYSTEM

BACKGROUND AND SUMMARY OF THE INVENTION

The present invention relates generally to magnetostrictive transducer measuring systems of the type having a transducer wire which forms a sonic waveguide for measuring the position of a transducer magnet movable along the length of the wire. The present invention has notable utility in measuring the level of fuel in a fuel storage tank.

It is a primary object of the present invention to provide a new and improved magnetostrictive transducer measuring system of the type described for accurately and precisely measuring the level of fuel in a fuel storage tank. In accordance with the present invention, the measuring system employs a new and improved method of measurement useful for accurately detecting a tank leak.

It is another object of the present invention to provide in a magnetostrictive transducer measuring system of the type described, a new and improved method of measurement which reduces measurement errors due to magnetic hysteresis accompanying a change in direction of movement of the transducer magnet.

It is a further object of the present invention to provide in a magnetostrictive transducer measuring system of the type described, a new and improved method of measuring the position of one or more transducer magnets movable along the length of the transducer wire.

It is a further object of the present invention to provide in a magnetostrictive transducer measuring system of the type described, a new and improved method of measurement which minimizes errors and simplifies the circuitry required for accurate and precise measurement. In accordance with this aim, when a current pulse is applied to the transducer wire, two or more torsional sonic pulses are simultaneously produced in the transducer wire through the interaction of the magnetic field of the transducer wire and the magnetic fields of two or more transducer magnets positioned along the wire. The torsional sonic pulses are sequentially detected by a sensor and the time interval between the detected sonic pulses is used to accurately and precisely determine the distance between the magnets. The position or movement of each magnet relative to each other magnet can then be determined. By employing one of the transducer magnets as a fixed reference magnet, the absolute position of each other magnet can be determined.

It is a further object of the present invention to provide a new and improved probe for measuring the level of fuel and water in a fuel storage tank. The probe is adapted to be connected to transmit, to a remote control station, the fuel level and water level within the tank and the temperature of fuel at each of several predetermined levels within the tank. The probe is designed to be economically manufactured and assembled with a probe length customized in accordance with the requirements of each tank installation.

Other objects will be in part obvious and in part pointed out more in detail hereinafter.

A better understanding of the invention will be obtained from the following detailed description and accompanying drawings of an illustrative application of the invention.

DESCRIPTION OF PREFERRED EMBODIMENTS

Figure 3:
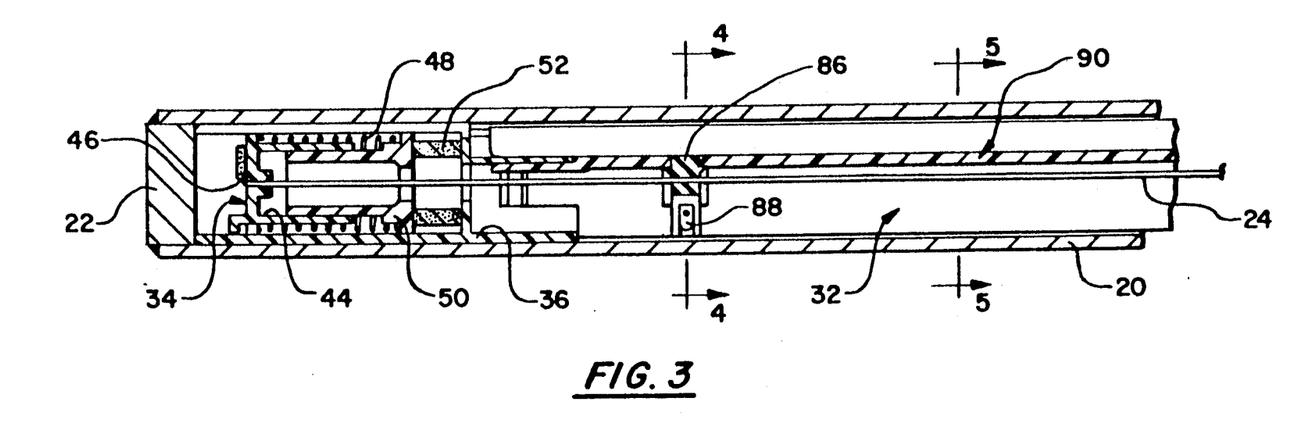

In the drawings, like numerals are used to represent the same or like functioning parts. The drawings illustrate a measuring system which employs an elongated probe 10 for measuring the level of water 12 and fuel 14 in an underground fuel storage tank 16. The probe 10 has an airtight housing with an upper elongated access housing 18 and a long, depending aluminum tube 20 with a nominal ⅜ inch OD and 0.620 inch ID. A plug 22 (FIG. 3) closes the lower end of the tube 20.

A magnetostrictive transducer wire 24 (FIGS. 2, 3, 7a, 11), having for example a 0.020 inch diameter circular cross section, extends centrally within the tube 20 from the upper access housing 18 to adjacent the lower end of the tube 20. The transducer wire 24 provides a sonic waveguide for the propagation of torsional sonic pulses in a known manner for linear measurement. The tube 20 and wire 24 have a length up to twelve feet or more, depending on the vertical height of the tank 16. The wire 24 is made of a suitable magnetostrictive material and for example is formed from Nispan C wire stock (composed primarily of nickel and iron) having a diameter greater than the transducer wire 24. The wire stock is annealed and then cold drawn (in one or more steps, with a maximum reduction of 20% per step) to the diameter of the transducer wire 24. The cold drawn wire is then heat treated by passing a three ampere electrical current through the wire for approximately four hours.

Figure 2:
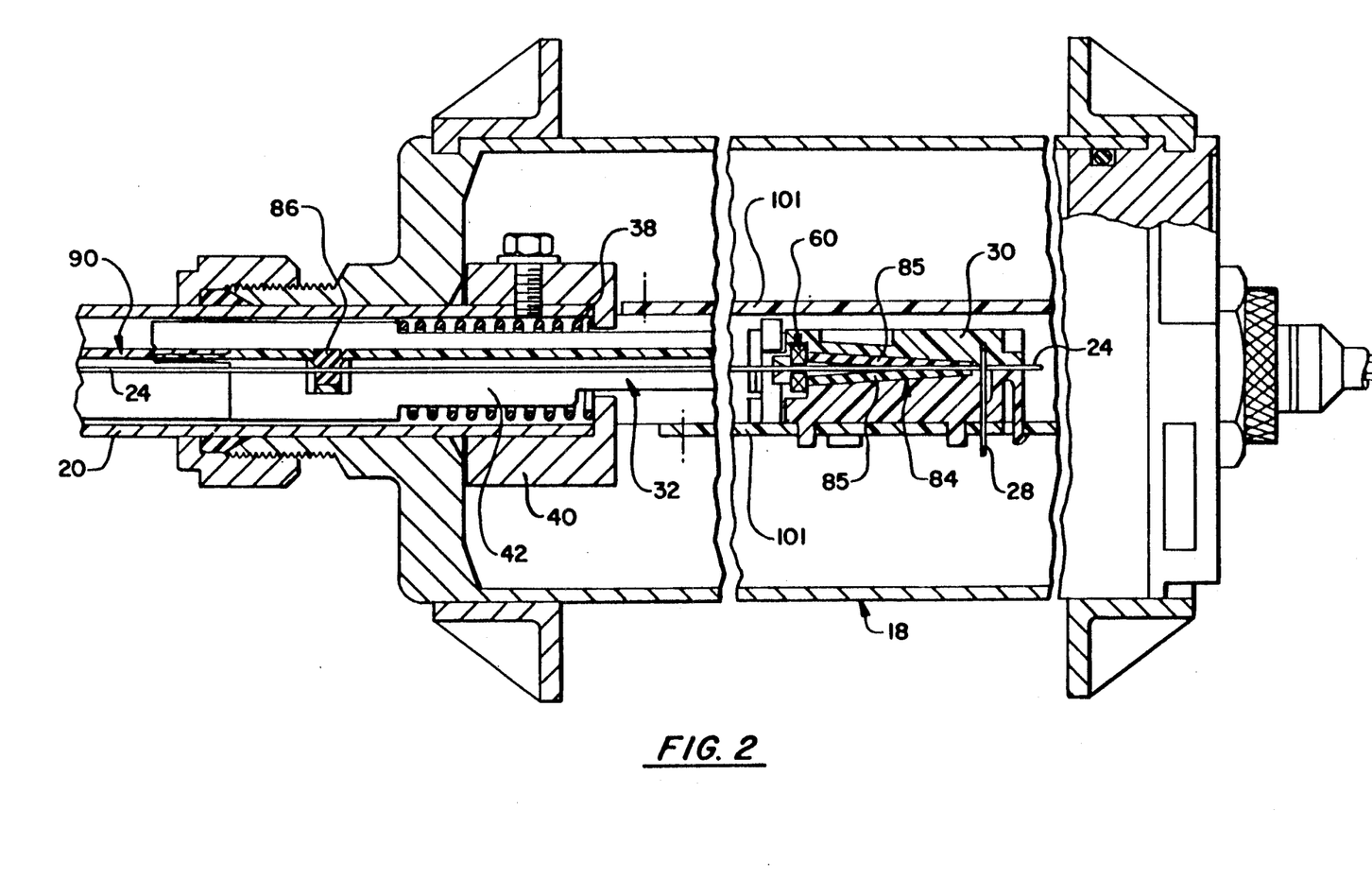
FIGS. 2 and 3 are partial longitudinal section views, partly broken away and partly in section, of the probe.
Figure 4:
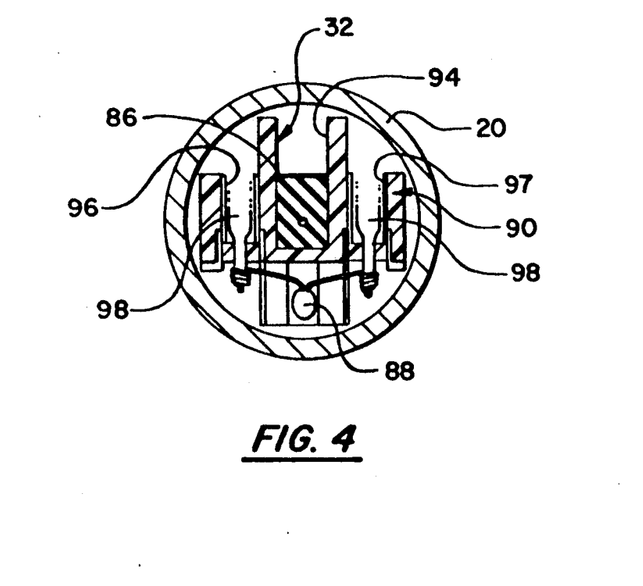
FIGS. 4 and 5 are enlarged transverse section views, partly in section, of the probe, taken along lines 4—4 and 5—5 of FIG. 3.
Figure 5:
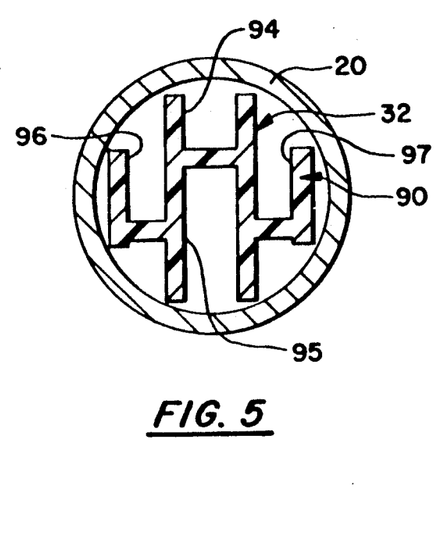

The upper end of the wire 24 is wedged within a generally V-shaped slot in a wire terminal 28 (FIG. 2). The terminal 28 is mounted in a transverse slot in a molded plastic support housing 30. An all plastic, elongated modular bracket 32 (FIGS. 2-4) extends within the tube 20 between the upper access housing 18 and lower end plug 22. A sleeve assembly 34 (FIG. 3) at the lower end of the bracket 32 has an outer sleeve 36 biased into engagement with the lower end plug 22 (with a force of approximately five pounds) by an upper compression spring 38 (FIG. 2). The compression spring 38 is mounted between a collar 40 secured onto the upper end of the tube 20 and an adjacent peripheral shoulder on a channel end piece 42 of the support bracket 32. The lower end of the transducer wire 24 is threaded through a central hole in a lower end face of an intermediate sleeve 44 (FIG. 3) and then bent over to form an end terminal 46 and to fix the wire against withdrawal. The intermediate sleeve 44 is biased downwardly by a lower compression spring 48 (with a force of approximately two pounds) to maintain the wire 24 under tension and thereby maintain the linearity and rigidity of the wire 24 for accurate linear measurement. The lower compression spring 48 is mounted between a bottom peripheral flange of the intermediate sleeve 44 and a top peripheral flange of an inner sleeve 50. (In an alternative arrangement diagrammatically illustrated in FIG. 11, the lower end of the transducer wire 24 is fixed and the wire 24 is held in tension by a suitable spring 49 connected to the upper end of the wire 24.)

A circular ring magnet 52 (FIG. 3) is mounted within the tube 20 coaxially about the lower end of the wire 24. The magnet 52 is secured between the inner and outer sleeves 50, 36. The magnet 52 is permanently magnetized in a radial direction with its outer and inner cylindrical surfaces forming North and South poles respectively. In the shown embodiment, the magnet 52 has an OD of 0.375 inch, an ID of 0.285 inch and an axial length of 0.25 inch.

Figure 7A:
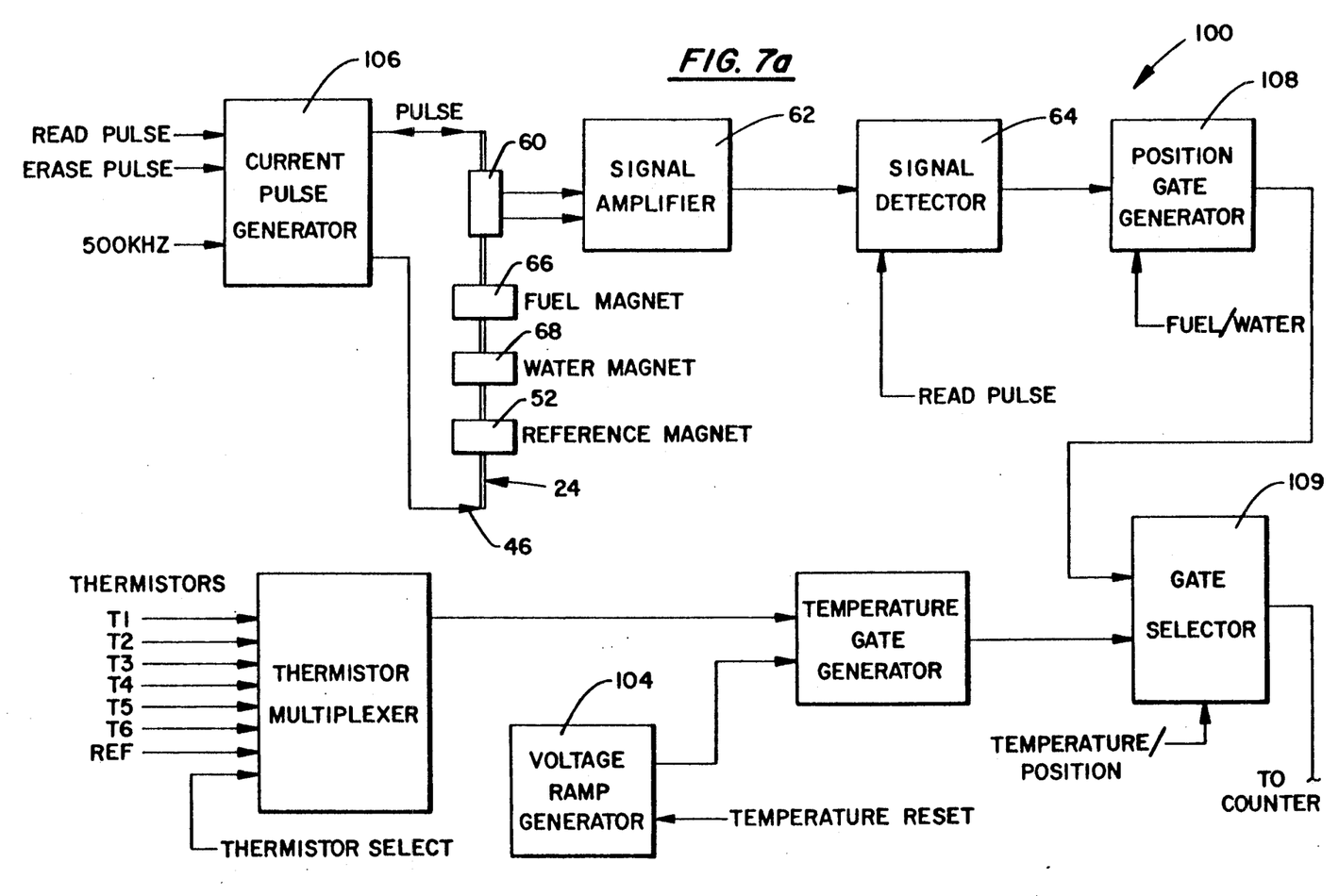
FIGS. 7a and 7b provide a generally diagrammatic illustration of an operating system and a magnetostrictive transducer of the probe.

A torsional sonic pulse sensor 60 (FIG. 2) is mounted within a pocket in the support housing 30 spaced below the upper terminal 28. The sensor 60 comprises a coil bobbin with two, parallel wound, pickup coils encircling the wire 24. The two coils, each having 450 turns, are differentially connected to a suitable amplifier 62 (FIG. 7a). When a torsional sonic pulse passes through the coils, it induces an electrical pulse in each coil. The amplifier 62 is connected to a signal detection circuit 64 (FIG. 7a) which generates a detection timing signal when the induced signal voltage, after amplification, passes through a zero midpoint of the signal after reaching a preestablished threshold value.

Figure 6:
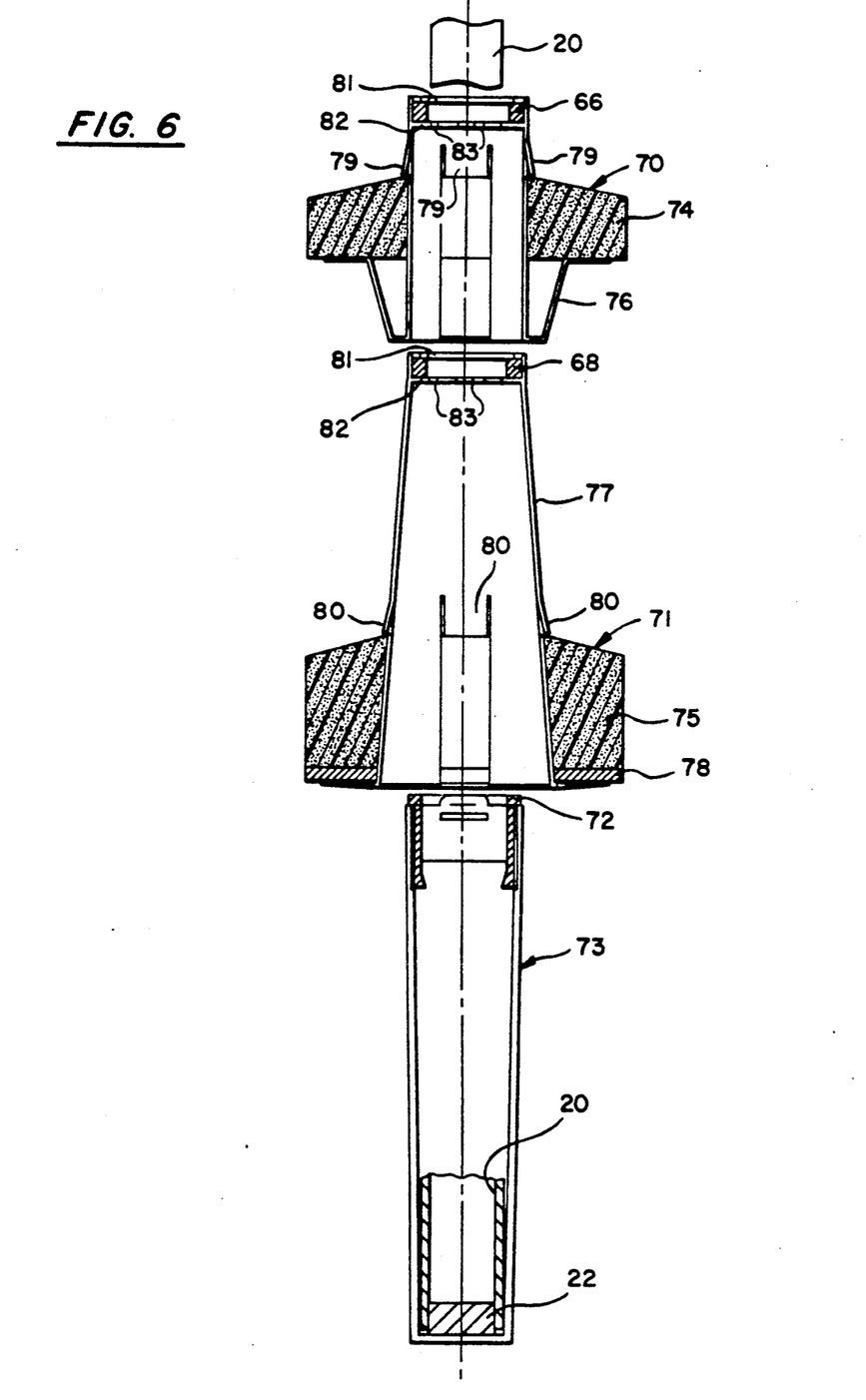
FIG. 6 is a partial longitudinal section view, partly broken away and partly in section, of the probe, showing upper and lower floats and a lower end boot of the probe.

Two ring magnets 66, 68 (FIGS. 6, 7a) are mounted on the tube 20 intermediate the lower fixed magnet 52 and upper sensor 60. Each magnet 66, 68 is mounted generally coaxially about the transducer wire 24 and is permanently magnetized in the same radial direction as the fixed ring magnet 52. In the shown embodiment, each intermediate ring magnet 66, 68 has an OD of 1.30 inch, ID of 0.95 inch and axial length of 0.25 inch. All three permanent magnets 52, 66, 68 are made of a suitable composite, ceramic ferrite material.

Figure 1:
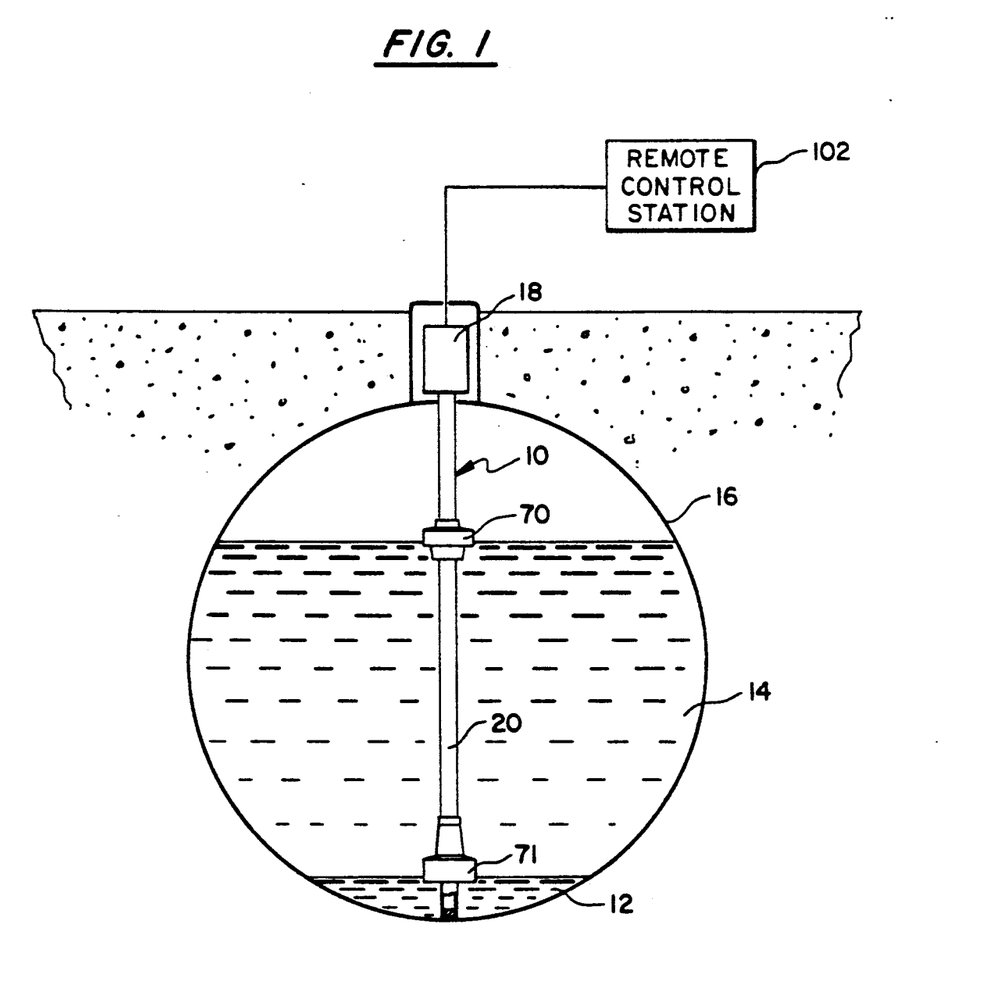
FIG. 1 is a generally diagrammatic illustration, partly broken away and partly in section, of an underground tank installation of a liquid level measuring probe employing a magnetostrictive transducer measuring system incorporating an embodiment of the present invention.

Each intermediate magnet 66, 68 is part of a separate float 70, 71 (FIG. 6) which encircles the tube 20. The upper float 70 floats on the fuel 14. The lower float 71 has a density greater than fuel and less than water and floats, immersed in fuel, on the water 12 at the bottom of the tank 16 (FIG. 1). If the water level is below a predetermined threshold, an internal annular flange 82 of the lower float 71 rests on an upper end cap 72 of an insulator boot 73 (FIG. 6) mounted on the lower end of the tube 20. The probe 10 is mounted upright, preferably with the bottom of the probe resting on the bottom of the tank 16. The insulator boot 73 fully encloses the lower end of the tube 20 to insulate the tube 20 from any water 12 at the bottom of the tank 16 and thereby to minimize or eliminate any electrolysis between the tube 20 and tank 16.

Each float 70, 71 is designed so that the respective ring magnet 66, 68 is above the surface of the respective liquid by a predetermined offset. The offset of the lower float magnet 68 is established so that the magnet 68 is at least three inches above the bottom fixed magnet 52 when the lower float 71 rests on the insulator boot cap 72. The offset of the upper float magnet 66 is established so that the magnet 66 is at least five inches below the sensor 60 when the tank 16 is full and three inches above the lower float magnet 68 when the lower end face of the upper float 70 engages the upper end face of the lower float 71.

Each float 70, 71 has a flotation ring 74, 75 mounted on a molded plastic body 76, 77. The lower float 71 also has a ballast ring sized according to the density of the fuel 14. The flotation rings 74, 75 and ballast ring 78 are retained by suitable integral detent fingers 79, 80 of the float body 76, 77. The ring magnets 66, 68 are retained between axially spaced, internal annular flanges 81, 82 of the float body 76, 77. The upper flange 81 is suitably formed to permit insertion of the ring magnet 66, 68. The lower flange 82 has a plurality of equiangularly spaced, radially inwardly pointing centering guides 83 engageable with the tube 20 to keep the float coaxial with the tube 20.

A wire damper 84 (FIG. 2) is provided between the sensor 60 and upper wire terminal 28. The damper 84 comprises a pair of opposed flat resilient strips 85 of 40 durometer hardness. The strips 85 are secured within a cavity in the upper support housing 30 with the strips 85 inclined downwardly away from the wire 24 and with the upper ends of the opposed strips 85 pressed against the wire 24 by the internal walls of the housing cavity. Because of the upward increasing engagement of the strips 85 with the wire 24, an upwardly traveling torsional sonic pulse is absorbed by the strips 85 without significant reflection of the pulse energy.

A plurality of coaxial, plastic centering guides 86 (FIGS. 2, 34) are mounted on the elongated bracket 32, approximately every six inches along the length of the wire 24. Each guide 86 has a hole receiving the wire 24 to center the wire 24 without attenuating the torsional sonic pulses in the wire. Thermistors 88 (FIGS. 3, 4) are mounted on the bracket 32, suitably spaced along the length of the wire 24, to measure the fuel temperature at selected levels within the tank 16. The elongated bracket 32 rigidly supports the centering guides 86 and thermistors 88 and the electrical leads to the thermistors 88 and lower end 46 of the transducer wire 24.

The elongated bracket 32 is formed by a plurality of separable modules comprising the lower sleeve assembly 34, upper channel end piece 42 (FIG. 2) and a long intermediate channel consisting of a plurality of identical intermediate channel pieces 90 (FIGS. 2-5). The channel pieces 42, 90 have interfitting ends to secure those pieces together and to secure the intermediate channel to the lower sleeve assembly 34. The channel pieces 42, 90 together form several elongated parallel channels, including two back-to-back central channels 94, 95 (FIGS. 4, 5) and two side channels 96, 97 on opposite sides of the central channels 94, 95. The larger central channel 95 receives the transducer wire 24 and the smaller central channel 94 receives the electrical leads to the thermistors 88 and lower end 46 of the transducer wire 24. The thermistor leads are connected to thermistor terminals 98 within the side channels 96, 97 and are fed into the smaller central channel 94 through slots in the channel sides.

Figure 7B:
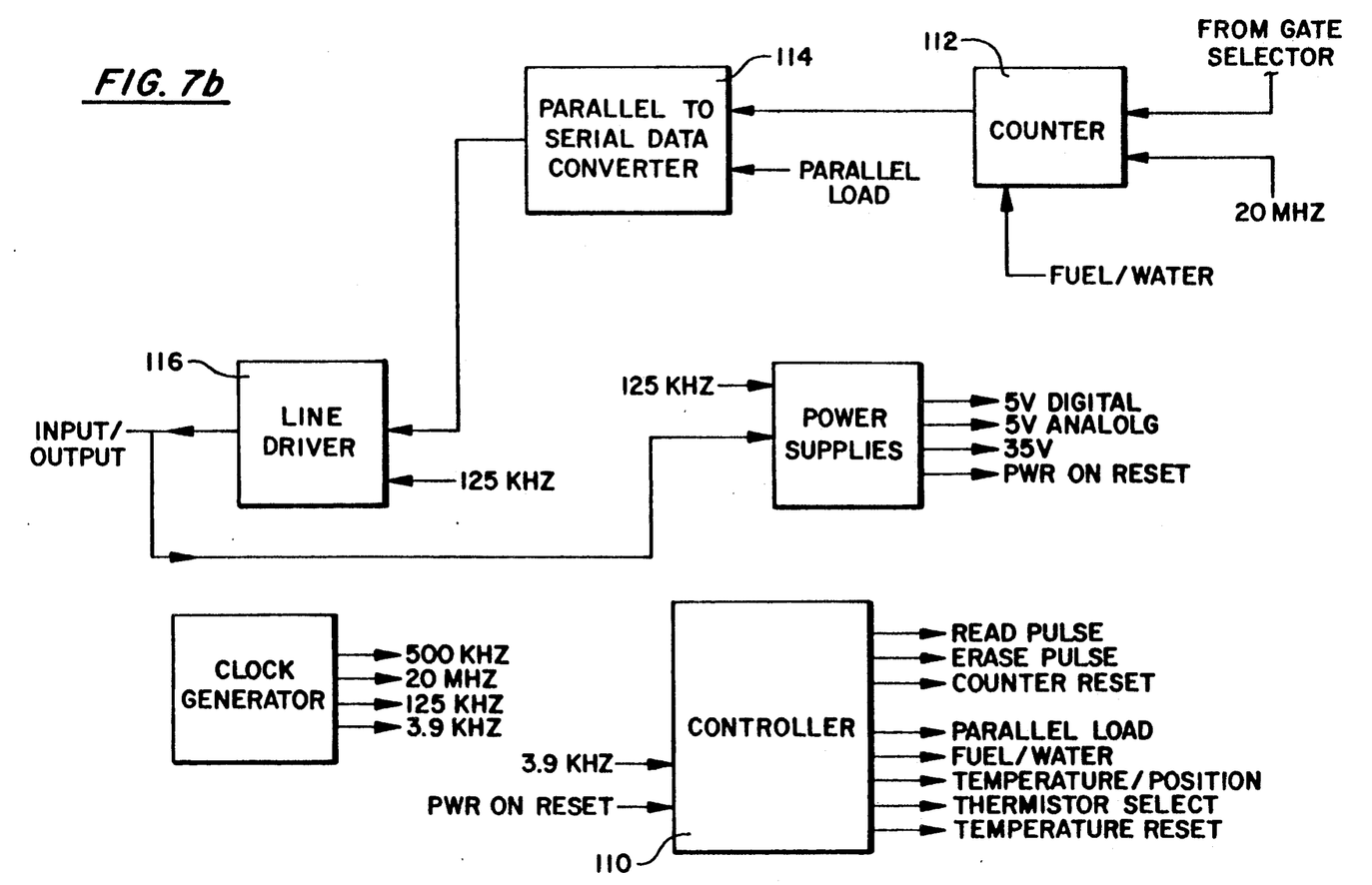
Figure 8:
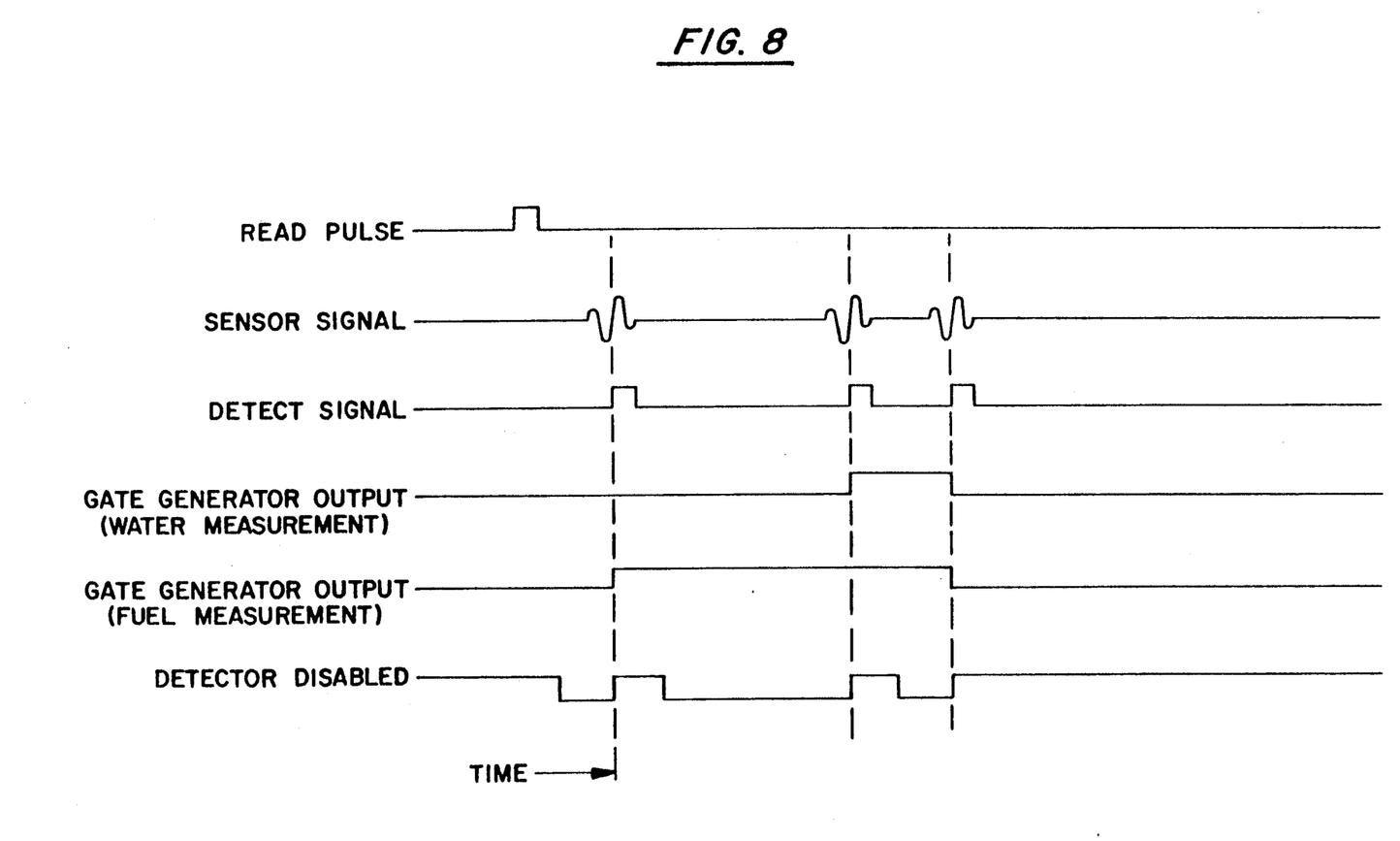
FIG. 8 is a timing chart illustrating the relationship of certain signals produced during a cycle of operation of the probe operating system.

A probe operating system 100 (FIG. 7a), mounted within the access housing 18, has two electrical leads providing an input/output connection to a remote control station 102 (FIG. 1). The electrical components of the probe operating system 100 are mounted on a pair of rigid printed circuit boards 101 (FIG. 2). The upper support housing 30 is also mounted on one of the printed circuit boards 101. The remote control station 102 supplies DC power (approximately 7 volts) to the probe. When energized, the probe operating system 100 repeatedly cycles through a measurement and data transmission cycle having a duration of approximately 350 milliseconds. During each cycle, the operating system 100 measures the fuel temperature provided by each thermistor 88, measures the height of water 12 and fuel 14 in the tank 16 and transmits the temperature, fuel level and water level measurements to the remote control station 102. A system controller 110 (FIG. 7b) of the operating system 100 provides certain output signals, shown in FIG. 7b, which provide input signals to other components of the system shown in FIGS. 7a and 7b. Each measurement is made by accumulating a count in a counter 112 (FIG. 7b) during a measured time interval which varies with the measurement being made. During each measured time interval, the counter 112 is stepped at 20 MHz. The counter 112 is reset by the system controller 110 just prior to each measurement. After each measurement, the accumulated count is transmitted from the counter 112 via a parallel to serial converter 114 and a driver 116 to the remote control station 102. Asynchronous AC digital transmission is employed. Each thermistor temperature is measured by measuring the time interval for the output voltage of a voltage ramp generator 104 (FIG. 7a) to reach a temperature related voltage corresponding to the thermistor resistance.

A current pulse generator 106 has two output leads soldered to the upper wire terminal 28 and lower end terminal 46 of the transducer wire 24. During each system operating cycle, the pulse generator 106 is stepped by the system controller 110, through a cycle of twelve steps for applying twelve current pulses to the transducer wire 24. The twelve current pulses comprise an initial erase pulse followed by eleven read pulses. The twelve pulses are two microseconds in duration each and 16 milliseconds apart. Each erase pulse has a 0.8 ampere current and each read pulse has a slightly greater current of 1.0 amperes. The erase pulse has a fixed polarity opposite to the fixed polarity of the remaining read pulses.

Each read pulse is employed as a transducer drive pulse. Each drive pulse cooperates with each of the three permanent magnets 52, 66, 68 to produce a torsional sonic pulse in the wire 24 in accordance with known magnetostrictive principals. For example, see Tellerman U.S. Pat. No. 3,898,555, dated Aug. 5, 1975 and entitled "Linear Distance Measuring Device Using A Movable Magnet Interacting With A Sonic Waveguide". Briefly, each drive pulse produces a momentary circumferential magnetic field along the magnetostrictive wire 24. This circumferential magnetic field and the magnetic field of each ring magnet 52, 66, 68 react to produce a torsional sonic pulse in the wire 24. Thus, when each drive pulse is generated, each ring magnet 52, 66, 68 cooperates with the wire 24 to form a transducer for magnetically producing a torsional sonic pulse in the wire 24. Three substantially identical, torsional sonic pulses are simultaneously initiated by the three transducers. The three torsional sonic pulses travel in fixed spaced relationship at the same precise sonic velocity along the wire waveguide 24 to the sensor 60 (at approximately 1/9th inch per microsecond in the described embodiment). After an initial 56 microsecond delay after each read pulse, the signal detection circuit 64 is enabled to detect the arrival of the three sonic pulses. After each sonic pulse is detected, the detection circuit 64 is momentarily disabled for 22 microseconds. After detecting all three sonic pulses, the detection circuit 64 is disabled until after the next read pulse. Any reflected torsional sonic pulses traveling in the opposite direction to the primary sonic pulses are ignored. The initial delay avoids detection errors caused by electrical noise in the detection circuit 64 from the read pulse. The detection circuit 64 is momentarily disabled after detecting each sonic pulse to stabilize the detection circuit for detecting the following sonic pulse. The three magnets are always sufficiently far apart so that each sonic pulse is detected. The 16 millisecond interval between drive pulses provides adequate time for attenuation of all residual reflected sonic waves in the wire waveguide 24 and for charging a suitable capacitor for generating the succeeding drive pulse.

The signal detection circuit 64 is connected via a position gate generator 108 and a gate selector 109 to the counter 112 to measure the time interval between the first and third detection signals (produced by the upper float magnet 66 and bottom fixed magnet 52) and the time interval between the second and third detection signals (produced by the lower float magnet 68 and bottom fixed magnet 52). The system controller 110 controls the position gate generator 108 so that the time interval between the second and third detection signals is measured after the first read pulse to measure the height of water in the tank 16. The time interval between the first and third detection signals is measured after each of the ten remaining read pulses. Each time measurement count of the counter 112 is transmitted to the remote control station 102 immediately after the measurement is completed and before the following drive pulse. At the remote control station 102, the ten fuel level measurements are averaged to improve the resolution of the measurement.

The average fuel level measurement is modified at the remote control station 102 in accordance with known (calibrated) offsets and in accordance with the measured temperature at each thermistor level. The temperature measurements are employed to adjust the fuel level measurement in accordance with a standard (calibrated) temperature compensation schedule to provide adjusted or standardized fuel level measurements useful for comparison purposes.

Thus, the bottom fixed magnet 52 produces a fixed reference signal for measuring the height of both water and fuel. The use of such a fixed reference signal in place of the timing of the read pulse (a) avoids any timing errors in the amplification and detection circuits and thereby permits substantial simplification of those circuits and (b) avoids timing errors caused by thermal expansion and contraction of the tube 20.

The fixed reference magnet 52 is preferably mounted at the bottom of the wire waveguide 24 as described. Since the fixed reference magnet 52 is close to the bottom of the tank 16 and is surrounded by the liquid within the tank 16, the position of the magnet 52 relative to the bottom of the tank 16 is substantially unaffected by temperature variations outside the tank and above the fuel. Alternatively, the fixed reference magnet 52 could be mounted at the top of the wire waveguide 24. (In other applications of the magnetostrictive measuring device, the fixed reference magnet may be mounted at any predetermined position along the wire waveguide where it is adequately spaced from the other transducer magnets.)

The first read pulse after the erase pulse functions as a restore pulse for resetting the residual circumferential magnetism of the wire 24. Because the restore pulse is also employed for measuring the height of water, the water level measurement is only accurate within several thousandths of an inch. However, the following more critical measurements of the fuel level are accurate within 0.001 inch or less. Thus, the combination of the erase and restore pulses conditions the residual magnetic field of the magnetostrictive wire 24 so as to achieve greater measurement accuracy.

When used to measure the fuel and water levels as described, the probe readings typically are used as part of a fuel inventory system for measuring the amount of fuel delivered to the tank and dispensed from the tank. Also, the probe readings typically are used as part of a leak test designed to detect small changes in the fuel level caused by a fuel leak. Asmundsson et al U. S. Pat. No. 4,349,882, dated Sept. 14, 1982 and entitled "Liquid Level Measuring System", discloses a system employing capacitance probe readings for such purposes.

Environmental laws now require a leak test which is capable of detecting a fuel leak at a relatively low rate of for example 0.1 or 0.2 gallons per hour. In the typical underground fuel storage tank, a change in the fuel level must be accurately measured to within 0.001 inch or less to determine whether a leak at that low rate is present. During such a leak test (during which fuel is not delivered to or dispensed from the tank), the change in the fuel level typically will be only a few thousandths of an inch and less than 0.050 inch. The measured fuel level must be adjusted in accordance with the temperature at each thermistor level because thermal expansion and contraction of the fuel can raise or lower the fuel level sufficiently to significantly affect the test results. Otherwise, a temperature change could either mask an actual leak or erroneously indicate the presence of a leak. Also, the test must be capable of accurately measuring both an increase and decrease in the fuel level and thus a change in the direction of displacement of the upper float magnet.

Accordingly, during a leak test, it is important to accurately measure the displacement of the upper float magnet in each direction, including displacement after a change in direction, within a tolerance of 0.001 inch or less. However, magnetic hysteresis can affect the accuracy of the measurement, primarily after displacement of the float magnet changes direction, and thus can affect the accuracy of a leak test measurement when accuracy is critically important.

It has been found that the erase and restore pulses at the beginning of each ten pulse fuel measurement cycle substantially reduces hysteresis error, primarily during an initial increment of float displacement after the float changes direction. Although not fully understood, this reduction in hysteresis error is believed to be due to the combined effect of the erase pulse of temporarily reversing the circumferential magnetism of the wire 24 and the effect of the restore pulse of resetting the residual circumferential magnetism of the wire 24 to a relatively constant initial level immediately before the succeeding ten read pulses.

Figure 9:
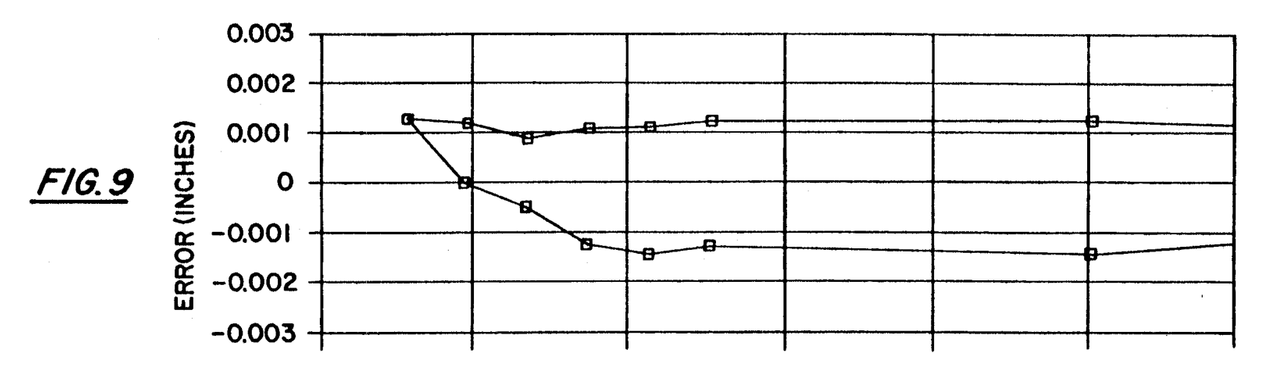
FIGS. 9 and 10 are graphs illustrating certain fuel level measurements accompanying certain modes of operation of the measuring system.
Figure 10:
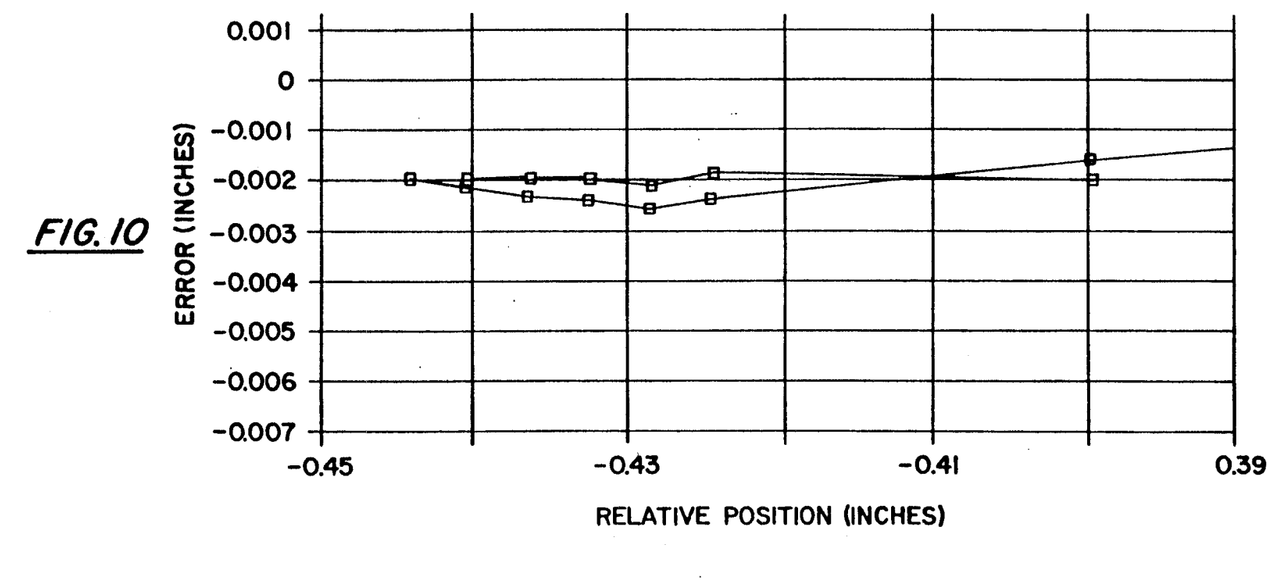
Figure 11:
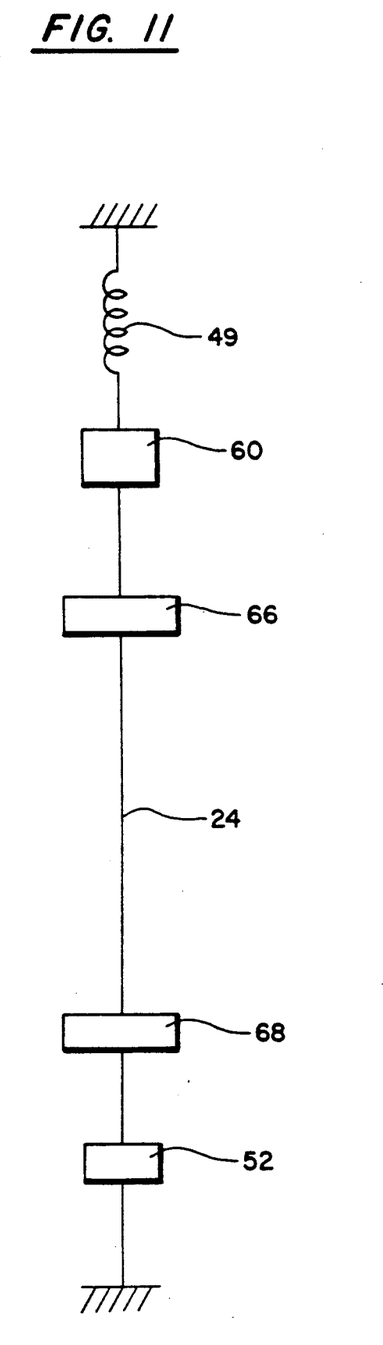
FIG. 11 is a generally diagrammatic illustration of an alternative arrangement for mounting a transducer wire of the magnetostrictive transducer.

Two graphs are shown in FIGS. 9 and 10. Both graphs illustrate the hysteresis effect upon a reversal of the direction of displacement of the upper float magnet 66. FIG. 9 illustrates the hysteresis effect without the erase and restore pulses and FIG. 10 illustrates the hysteresis effect when the erase and restore pulses are applied as described. In both graphs, the actual position of the float magnet 66 is shown on the horizontal axis and the measurement error is shown on the vertical axis. In FIG. 9, the variation in the measured level (at any given float position) after the magnet displacement changes direction is relatively significant, with more than a 0.002 inch variation (even though the actual measurement error is somewhat less). In FIG. 10, the variation in the measured level after the magnet displacement changes direction is much lower and within the desired tolerance. That is, when the erase and restore pulses are employed as described, the angle of divergence or slope of the measurement readings is much less after a change in direction of magnet displacement. In a leak test, the actual measurement error is not of primary importance. What is more important is that the measurements accurately determine any change in fuel level when the change is only a few thousandths of an inch. With reference to FIG. 10, it can be seen that after the displacement of the upper float magnet 66 changes direction, the measurements do accurately measure a change in the fuel level within the desired tolerance.

As will be apparent to persons skilled in the art, various modifications, adaptations and variations of the foregoing specific disclosure can be made without departing from the teachings of the present invention.

We claim:

1. A method of measurement with a magnetostrictive transducer measuring device having a magnetostrictive transducer wire forming a torsional sonic pulse waveguide, at least one transducer magnet spaced along the wire waveguide and cooperable therewith to produce a torsional sonic pulse in the wire waveguide upon the application of a predetermined current pulse through the wire and a torsional sonic pulse sensor positioned along the wire waveguide spaced from the magnet to produce an electrical pulse induced by the passage of a said torsional sonic pulse by the sensor, the method comprising the steps of employing a plurality of said transducer magnets spaced along the wire waveguide with only one of the magnets used as a reference magnet, applying said current pulses through the wire in a first predetermined direction and measuring the position of a first magnet other than the reference magnet by measuring the time interval between only the electrical pulses induced by the sonic pulses produced by said first magnet and said reference magnet.

2. A method of measurement according to claim 1 wherein the measuring device comprises at least three of said transducer magnets spaced along the wire waveguide, the method further comprising the steps of measuring the position of a second magnet other than the reference magnet by measuring the time interval between only the electrical pulses induced by the sonic pulses produced by said second magnet and said reference magnet.

3. A method of measurement with a magnetostrictive transducer measuring device having a magnetostrictive transducer wire forming a torsional sonic pulse waveguide, at least one transducer magnet spaced along the wire waveguide and cooperable therewith to produce a torsional sonic pulse in the wire waveguide upon the application of a predetermined current pulse through the wire and a torsional sonic pulse sensor positioned along the wire waveguide spaced from the transducer magnet to product an induced electrical pulse upon the passage of a said torsional sonic pulse thereby, the method comprising the steps of employing at least two of said transducer magnets spaced along the wire waveguide with one of the magnets used as a reference magnet, applying a pulse set of at least one said current pulse through the wire in a first predetermined direction and measuring the position of a first magnet other than the reference magnet by measuring the time interval between the induced electrical pulses from the sonic pulses from said first magnet and said reference magnet, and applying, immediately before applying said pulse set, a predetermined erase current pulse through the wire in a second direction opposite to said first direction and then a predetermined restore current pulse through the wire in said first direction.

4. A method of measurement according to claim 3 wherein said erase pulse has a current slightly less than the current of said first pulse.

5. A method of measurement with a magnetostrictive transducer measuring device having a magnetostrictive transducer wire forming a torsional sonic pulse waveguide, at least one transducer magnet spaced along the wire waveguide and cooperable therewith to produce a torsional sonic pulse in the wire waveguide upon the application of a predetermined current pulse through the wire and a torsional sonic pulse sensor positioned along the wire waveguide spaced from each said transducer magnet to produce an induced electrical pulse upon the passage of a said torsional sonic pulse thereby, the method comprising the steps of applying a pulse set of at least one said current pulse through the wire in a first predetermined direction, producing a reference signal with each said current pulse of said pulse set, and measuring the position of said one transducer magnet with each said current pulse of said pulse set by measuring the time interval between said reference signal and the induced electrical pulse from the sonic pulse from the transducer magnet, and applying, immediately before applying said pulse set, a predetermined erase current pulse through the wire in a second direction opposite to said first direction and then a predetermined restore current pulse through the wire in said first direction.

6. A method of measuring the level of liquid within a tank with a liquid level measurement probe having an elongated housing mounted upright within the tank with a lower end thereof at the bottom of the tank, a magnetostrictive transducer measuring device having an elongated, magnetostrictive transducer wire within the probe forming a torsional sonic pulse waveguide extending to the lower end of the elongated housing, a plurality of transducer magnets spaced along the wire waveguide, each cooperable therewith to produce a torsional sonic pulse in the wire waveguide upon the application of a predetermined current pulse through the wire, said plurality of transducer magnets comprising a single, fixed reference magnet, at least one float, surrounding the elongated housing, adapted to float on liquid within the tank, each float having a single said transducer magnet, and a torsional sonic pulse sensor positioned along the wire waveguide spaced from each transducer magnet to produce an induced electrical pulse upon the passage of each torsional sonic pulse thereby, the method comprising the steps of applying said current pulses through the wire in a first predetermined direction and determining the position of each float magnet by measuring the time interval between only the induced electrical pulses produced by he sonic pulses from the float magnet and said reference magnet.

7. A method of measurement according to claim 6 wherein the probe comprises a second said float, the method further comprising the step of determining the position of the magnet of the second float by applying a said current pulse through the wire in said first predetermined direction and measuring the position of the second float magnet by measuring the time interval between only the induced electrical pulses form the sonic pulses from said second float magnet and said reference magnet.

8. A method of measurement according to claim 6 wherein said time interval measurement comprises the steps of producing a detection timing signal upon the detection of each said induced electrical pulse and initiating and then terminating a count at a predetermined fixed frequency with the detection timing pulses from the sonic pulses from said first magnet and said reference magnet.

9. A method of measurement according to claim 6 wherein the reference magnet is mounted at a fixed position along the wire spaced further form the sensor than each said float magnet.

10. A liquid level measurement probe adapted to be mounted upright within a tank for measuring the level of liquid within the tank, the probe having a generally elongated housing comprising an upper access housing and an elongated tubular housing, depending from the access housing, with a lower end with a bottom providing the bottom of the elongated housing, a magnetostrictive transducer wire forming a torsional sonic pulse waveguide, wire mounting means for mounting the transducer wire waveguide under tension within the housing between the upper access housing and lower end of the tubular housing, at least one annular float, surrounding the tubular housing, adapted to float on liquid within the tank, each float having a single transducer magnet adapted to cooperate with the wire waveguide to produce a torsional sonic pulse in the wire upon the application of a predetermined current pulse through the wire, a pulse generator for applying said current pulses through the wire, a torsional sonic pulse sensor mounted within the upper access housing adjacent the wire waveguide to produce an induced electrical pulse upon the passage of a said sonic pulse thereby, a single, fixed reference, transducer magnet spaced from each float magnet and mounted along the wire waveguide to produce a torsional sonic pulse upon said application of said current pulse through the wire waveguide and measurement means selectively operable to measure the position of each float magnet to determine the height of the liquid within the tank by measuring the time interval between only the induced electrical pulses from the sonic pulses from the float magnet and fixed reference magnet, the wire mounting means comprising an elongated bracket, mounted within the tubular housing, extending from the access housing to the bottom of the tubular housing, spring means biasing the bracket into engagement with the bottom of the tubular housing, centering guides mounted along the bracket having openings receiving the wire waveguide for centering the wire waveguide within the tubular housing, and thermistors mounted along the bracket, each for measuring the temperature of liquid at a different level within the tank, the measurement means being operable to measure a time interval corresponding to the temperature measurement of each thermistor.

11. A liquid level measurement probe according to claim 10 wherein the elongated bracket forms a plurality of parallel channels, extending longitudinally within the tubular housing, including a first, relatively large central channel receiving the wire waveguide and a pair of side channels on opposite sides thereof, and wherein each thermistor has leads received in part in the side channels.

12. A liquid level measurement probe according to claim 11 wherein the elongated bracket comprises a second relatively small central channel in back-to-back relationship with said relatively large central channel, the thermistor leads being received in part in said second central channel.

13. A liquid level measurement probe adapted to be mounted upright within a tank for measuring the level of liquid within the tank, the probe having a generally elongated housing comprising an upper access housing and an elongated tubular housing, depending from the access housing, with a lower end with a bottom providing the bottom of the elongated housing, a magnetostrictive transducer wire forming a torsional sonic pulse waveguide, wire mounting means for mounting the transducer wire waveguide under tension within the housing between the upper access housing and lower end of the tubular housing, at least one annular float, surrounding the tubular housing, each float having a single transducer magnet adapted to cooperate with the wire waveguide to produce a torsional sonic pulse in the wire upon the application of a predetermined current pulse through the wire, a pulse generator for applying said current pulses through the wire, a torsional sonic pulse sensor mounted within the upper access housing adjacent the wire waveguide to produce an induced electrical pulse upon the passage of a said sonic pulse thereby, a single, fixed reference, transducer magnet spaced from each float magnet and mounted along the wire waveguide to produce a torsional sonic pulse upon said application of said current pulse through the wire waveguide, said two annular floats comprising a first float adapted to float on fuel within the tank and a second float adapted to float, immersed in fuel, on water at the bottom of the tank, and measurement means selectively operable to measure the position of the first float magnet by measuring the time interval between only the induced electrical pulses from the sonic pulses from the first float magnet and fixed reference magnet to measure the height of fuel within the tank and to measure the position of the second float magnet by measuring the time interval between only the induced electrical pulses from the sonic pulses from the second float magnet and fixed reference magnet to measure the height of water in the tank.

14. A liquid level measurement probe adapted to be mounted upright within a tank for measuring the level of liquid within the tank, the probe having a generally elongated housing comprising an upper access housing and an elongated tubular housing, depending from the access housing, with a lower end with a bottom providing the bottom of the elongated housing, a magnetostrictive transducer wire forming a torsional sonic pulse waveguide, wire mounting means for mounting the transducer wire waveguide under tension within he housing between the upper access housing and lower end of the tubular housing, at least one annular float, surrounding the tubular housing, adapted to float on liquid within the tank, each float having a single transducer magnet adapted to cooperate with the wire waveguide to produce a torsional sonic pulse in the wire upon the application of a predetermined current pulse through the wire, a pulse generator for applying said current pulses through the wire, a torsional sonic pulse sensor mounted within the upper access housing adjacent the wire waveguide to produce an induced electrical pulse upon the passage of a said sonic pulse thereby, a single, fixed reference, transducer magnet spaced from each float magnet and mounted along the wire waveguide to produce a torsional sonic pulse upon said application of said current pulse through the wire waveguide and measurement means selectively operable to measure the position of each float magnet by measuring the time interval between only the induced electrical pulses from the sonic pulses from the float magnet and fixed reference magnet to determine the height of the respective liquid within he tank, each float comprising an annular plastic body surrounding the tubular housing, a coaxial floatation ring mounted on the lower end of the body and a coaxial ring magnet, providing said float magnet, mounted on the upper end of the body.

15. A liquid level measurement probe adapted to be mounted upright within a tank for measuring the level of liquid within the tank, the probe having a housing with a lower elongated tubular housing with a lower end with a bottom providing the bottom of the elongated housing, a magnetostrictive transducer wire forming a torsional sonic pulse waveguide, wire mounting means for mounting the transducer wire waveguide under tension within the housing between the upper end thereof and lower end of the tubular housing, at least one annular float, surrounding the tubular housing, adapted to float on liquid within the tank, each float having a single, transducer magnet adapted to cooperate with the wire waveguide to produce a torsional sonic pulse in the wire upon the application of a predetermined current pulse through the wire, a pulse generator for applying said current pulses through the wire, a torsional sonic pulse sensor mounted within the upper end of the housing adjacent the wire waveguide to produce an induced electrical pulse upon the passage of a said sonic pulse thereby, a single, fixed reference, transducer magnet spaced from each float magnet and mounted along the wire waveguide to produce a torsional sonic pulse upon said application of said current pulse through the wire waveguide and measurement means selectively operable to measure the position of each float magnet by measuring the time interval between only the induced electrical pulses from the sonic pulses from the float magnet and fixed reference magnet to determine the height of the respective liquid within the tank, the wire mounting means comprising an elongated bracket, mounted within eh housing, extending from the upper end of the housing to the bottom of the tubular housing, spring means biasing the bracket into engagement with the bottom of the tubular housing, centering guides mounted along the bracket having openings receiving the wire waveguide for centering the wire waveguide within the tubular housing, and thermistors mounted along the bracket, each for measuring the temperature of liquid at a different level within he tank, the measurement means being operable to measure a time interval corresponding to the temperature measurement of each thermistor.

16. A liquid level measurement probe adapted to be mounted upright within a tank for measuring the level of liquid within the tank, the probe having a housing with a lower elongated tubular housing with a lower end with a bottom providing the bottom of the elongated housing, a magnetostrictive transducer wire forming a torsional sonic pulse waveguide, wire mounting means for mounting the transducer wire waveguide under tension within the housing between the upper end thereof and lower end of the tubular housing, at least one annular float, surrounding the tubular housing, each float having a single transducer magnet adapted to cooperate with the wire waveguide to produce a torsional sonic pulse in the wire upon the application of a predetermined current pulse through the wire, a pulse generator for applying said current pulses through the wire, a torsional sonic pulse sensor mounted within the housing adjacent the wire waveguide to produce an induced electrical pulse upon the passage of a said sonic pulse thereby, a single, fixed reference, transducer magnet spaced from each float magnet and mounted along the wire waveguide to produce a torsional sonic pulse upon said application of said current pulse through the wire, said two annular floats comprising a first float adapted to float on fuel within the tank and a second said float adapted to float, immersed in fuel, on water at the bottom of the tank, and measurement means selectively operable to measure the position of each float magnet by measuring the time interval between only the induced electrical signals from the sonic pulses form the first float magnet and fixed reference magnet to measure the height of fuel within the tank and by measuring the time interval between only the induced electrical signals from the sonic pulses form the second float magnet and fixed reference magnet to measure the height of water in the tank.

17. A liquid level measurement probe adapted to be mounted upright within a tank for measuring the level of liquid within the tank, the probe having a housing with a lower elongated tubular housing, a magnetostrictive transducer wire forming a torsional sonic pulse waveguide, wire mounting means for mounting the transducer wire waveguide under tension within the housing between the upper end thereof and the lower end of the tubular housing, at least one annular float, surrounding the tubular housing, adapted to float on liquid within the tank, each float having a single transducer magnet adapted to cooperate with the wire waveguide to produce a torsional sonic pulse in the wire upon the application of a predetermined current pulse through the wire, a single, fixed reference, transducer magnet spaced from each float magnet and mounted along the wire waveguide to produce a torsional sonic pulse upon said application of said current pulse through the wire, a pulse generator for applying a pulse set of at least one said current pulse through the wire, a torsional sonic pulse sensor mounted within the housing adjacent the wire waveguide to produce an induced electrical pulse upon the passage of a said sonic pulse thereby, and measurement means selectively operable to measure the position of each float magnet by measuring the time interval between only the induced electrical pulses from the sonic pulses from the float magnet and fixed reference magnet to determine the height of the respective float within the tank, each float comprising an annular plastic body surrounding the tubular housing, a coaxial floatation ring mounted on the body and a coaxial ring magnet, providing said float magnet, mounted on the body above the flotation ring.

18. In a liquid level measurement probe adapted to be mounted upright within a rank for measuring the level of liquid within the tank, the probe having a housing with a lower elongated tubular housing with a lower end with a bottom providing the bottom of the elongated housing, a magnetostrictive transducer wire forming a torsional sonic pulse waveguide, wire mounting means for mounting the transducer wire waveguide under tension within he housing between the upper end thereof and the lower end of the tubular housing, at least one annular float, surrounding the tubular housing, adapted to float on liquid within the tank, each float having a single transducer magnet adapted to cooperate with the wire waveguide to produce a torsional sonic pulse in the wire upon the application of a predetermined current pulse through the wire, a pulse generator for applying said predetermined current pulses through the wire, a torsional sonic pulse sensor mounted within the upper end of the housing adjacent the wire waveguide to produce an induced electrical pulse upon the passage of a said sonic pulse thereby, a detection circuit connected to the sensor for producing a detection circuit connected to the sensor for producing a detection timing signal upon the detection of each said induced electrical pulse, a single, fixed reference, transducer magnet spaced from each float magnet, the fixed reference magnet being mounted along the wire waveguide at the lower end of the tubular housing to produce a torsional sonic pulse upon said application of said current pulse through the wire waveguide, and measurement means selectively operable to measure the position o each said float magnet by measuring the time interval between only the induced electrical pulses from the sonic pulses from the float magnet and the fixed reference magnet.

19. A liquid level measurement probe according to claim 15 wherein the measurement means comprises a resettable counter, a system controller for resetting the counter before each said current pulse and means for indexing the counter at a fixed frequency during the time interval between the detection timing pulses from the sonic pulses from the float magnet and fixed reference magnet.

20. A liquid level measurement probe according to claim 18 wherein the fixed reference magnet is mounted at the lower end of the tubular housing.

21. A liquid level measurement probe according to claim 20 wherein the fixed reference magnet is mounted within the tubular housing.

22. A liquid level measurement probe according to claim 18 wherein the sensor comprises at least one coil surrounding the wire waveguide, wherein the fixed reference magnet and each float magnet is a ring magnet encircling the wire and wherein all of said magnets are radially magnetized in the same direction.

23. A method of measurement with a magnetostrictive transducer measuring device having a magnetostrictive transducer wire forming a torsional sonic pulse waveguide, at least one transducer magnet shiftable along the wire waveguide and cooperable therewith to produce a torsional sonic pulse in the wire waveguide upon the application of a predetermined current pulse through the wire, and a torsional sonic pulse sensor positioned along the wire waveguide spaced from said one transducer magnet to produce an electrical pulse upon the passage of a said torsional sonic pulse thereby, the method comprising the steps of applying a pulse set of at least one said current pulse through the wire in a first predetermined direction, measuring the position of said one transducer magnet with the timing of the electrical pulses form the sonic pulses from said one transducer magnet, and applying, immediately before applying said pulse set, a predetermined erase current pulse through the wire in a second direction opposite to said first direction and then a predetermined restore current pulse through the wire in said first direction.

* * * * *

UNITED STATES PATENT AND TRADEMARK OFFICE
CERTIFICATE OF CORRECTION

PATENT NO. : 5,076,100

DATED : December 31, 1991

INVENTOR(S) : Lawrence M. Hunter et al

It is certified that error appears in the above-identified patent and that said Letters Patent is hereby corrected as shown below:

On the title page, "Printstil" should be -- Prinstil --.

Signed and Sealed this

Twenty-ninth Day of June, 1993

Attest:

MICHAEL K. KIRK

*Attesting Officer*     *Acting Commissioner of Patents and Trademarks*